UNITED STATES PATENT OFFICE.

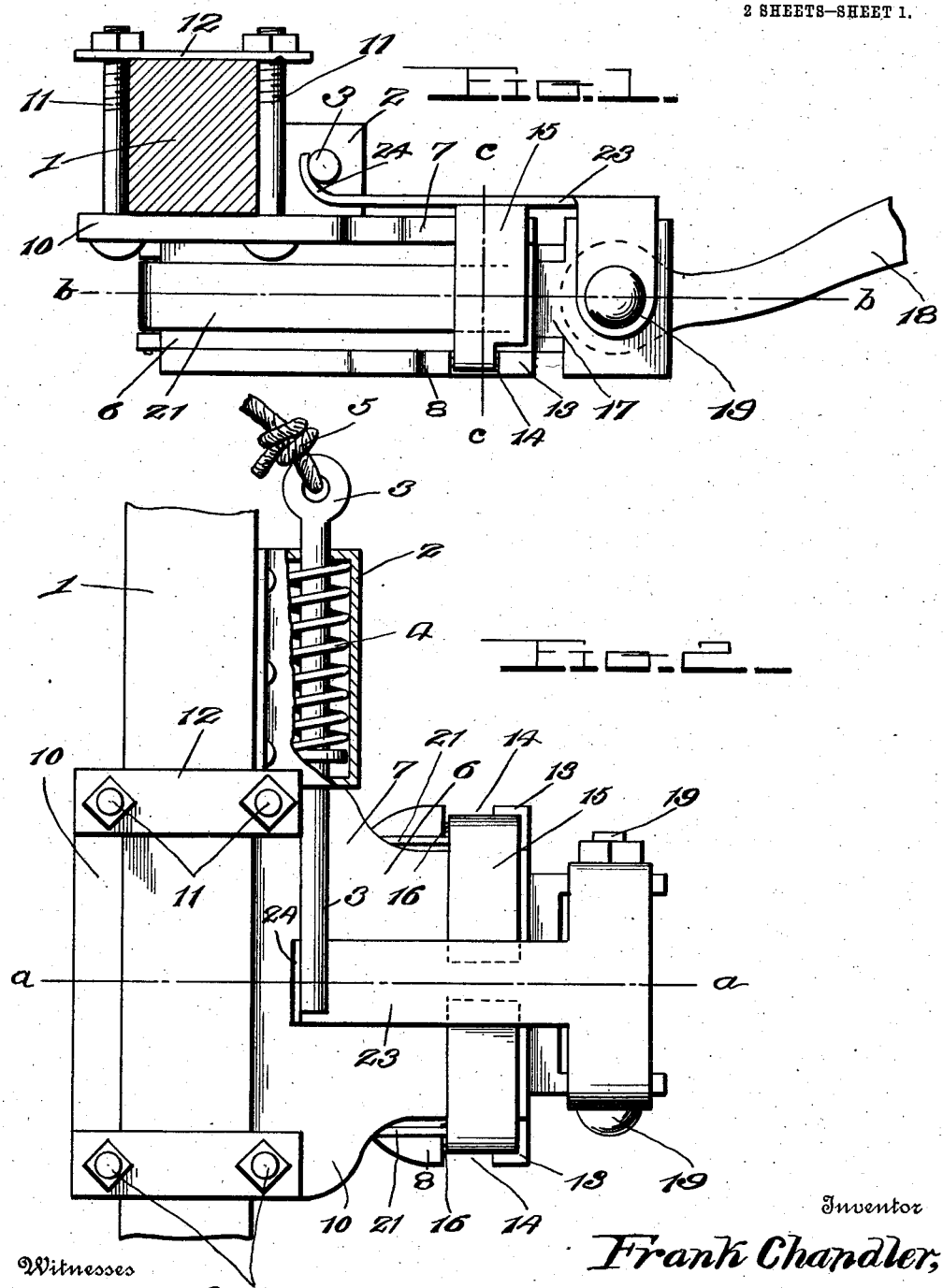

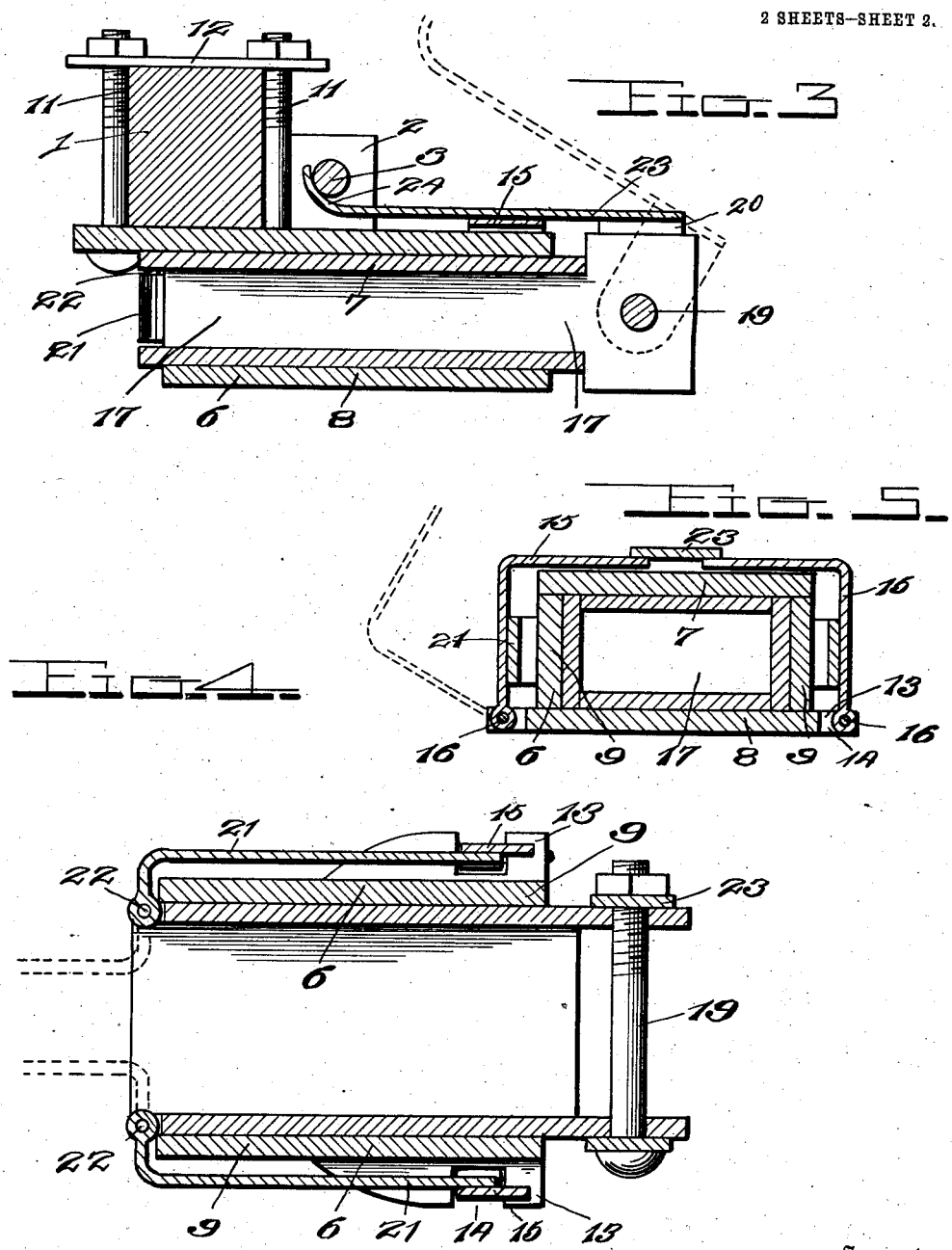

FRANK CHANDLER, OF PAMPA, WASHINGTON.

HORSE-RELEASER.

1,027,374.  Specification of Letters Patent.  Patented May 21, 1912.

Application filed January 24, 1912. Serial No. 673,072.

*To all whom it may concern:*

Be it known that I, FRANK CHANDLER, a citizen of the United States, residing at Pampa, in the county of Whitman and State of Washington, have invented certain new and useful Improvements in Horse-Releasers, of which the following is a specification, reference being had to the accompanying drawings.

This invention is an improved horse releaser especially adapted for use on a vehicle, in connection with the couplings of the thills or tongue, to release the thills or tongue, and hence the horse or team, in the event of a runaway, to avoid accidents, the invention consisting in the construction, combination and arrangement of devices hereinafter described and claimed.

In the accompanying drawings: Figure 1 is a side elevation of a horse releasing device constructed in accordance with my invention, showing the same in connection with a vehicle axle and a thill or tongue iron; Fig. 2 is a plan of the same; Fig. 3 is a vertical longitudinal sectional view on the plane indicated by the line $a$—$a$ of Fig. 2; Fig. 4 is a horizontal sectional view on the plane indicated by the line $b$—$b$ of Fig. 1; and Fig. 5 is a vertical transverse sectional view on the plane indicated by the line $c$—$c$ of Fig. 1.

For the purposes of this specification the front axle of a vehicle is indicated at 1. Near each end of the axle, on its front side, is secured a guide and keeper 2 in which operates a bolt 3, which bolt is projected normally by a spring 4. To the inner end of the bolt is attached an operating cord 5, by means of which the bolt may be withdrawn when it is desired to operate the device and release the horse or team. It will be understood that one of my devices is located near each end of the axle and that the operating cords will engage suitable direction means and will extend up, through the bottom of the body of the vehicle within convenient reach of the driver so that by a single movement the driver may withdraw the bolts of both of the releasing devices. On the under side of the axle, near each end thereof, is a sleeve 6 which is open at its front and rear ends and comprises a top 7, a bottom 8, and vertical parallel, longitudinal side walls 9. The top 7 has, at its rear end, laterally extending ears 10 provided with openings for the reception of securing bolts 11 which lie on the front and rear sides of the axle and coact with clips or yokes 12 in securing the sleeve firmly to the under side of the axle and yet so that it can be detached therefrom. The bottom of the sleeve is provided at its front corners with outwardly extending flanges 13, each of which is formed with a laterally extending recess 14. A pair of substantially L-shaped locking arms 15 are pivotally mounted in the said recesses by means of pins 16 and are arranged transversely with respect to the sleeve and adapted to be closed across the top thereof and to be turned outwardly and describe pivotal movement in a common vertical plane, so as to disengage the said sleeve and hang suspended therefrom. In connection with the sleeve I provide a coupling member 17 to which one of the shaft or tongue irons 18 may be pivotally secured by means of a bolt 19. Hence the thills or tongue used on the vehicle are pivotally connected to these coupling members and each coupling member has a rearwardly extending arm 20 to enter and extend through the sleeve.

To the rear end of the arm of each coupling member is pivotally connected a pair of substantially L-shaped locking arms 21, the pivots of which are vertical and indicated at 22. These locking arms are adapted to engage the rear ends of the vertical side walls of the sleeve and to extend forward and lie against the outer sides of said walls of the sleeve and to be engaged by the locking arms 15. The locking arms 15 are normally engaged by a locking and trigger arm 23 which lies on the upper side of the sleeve, bears on the ends of the locking arms 15, is provided at its rear end with an upturned flange 24 for engagement by the locking bolt and is provided at its front end with a pair of depending ears 25 which are pivotally mounted on the bolt that connects the coupling member to the tongue or thill iron.

It will be understood that when the arms 21 are engaged by the arms 15 and the latter are engaged by the trigger and locking arm 23 and said trigger and locking arm is engaged by the locking bolt, the coupling member will be securely held in the sleeve. When, however, in the event of a runaway, the bolt is withdrawn and caused to disengage the trigger and locking arm 23, the draft stress on the locking member will move the latter forwardly, thereby causing the arms 21 to turn outwardly and rearwardly in a horizontal plane and cause the locking arms 15 to be disengaged from said arms 21 and to also throw the locking and trigger arm 23 into disengaging position, and hence the coupling member will be entirely disengaged from the sleeve and will be drawn therefrom. The releasing device at both ends of the axle being released at the same time as hereinbefore stated, it follows that the tongue or thills will be entirely detached from the axle and hence while the horse or team may run away with the tongue or thills the vehicle will be entirely safe and accidents will be thus avoided.

While I have herein shown and described what I now consider a preferred embodiment of my invention I would have it understood that minor changes may be made in the form, construction and arrangement of the several parts without departing from the spirit of my invention and within the scope of the appended claims.

Having thus described my invention I claim:

1. In combination with a vehicle axle, a sleeve attached thereto, a locking arm pivotally connected to the sleeve for angular movement in a vertical plane and adapted to close upon the sleeve, a coupling device having means for the connection of a tongue or thill iron and provided with a rearwardly extending arm to enter the sleeve, a locking arm pivotally connected to the rear end of the arm of the coupling member for angular movement in a horizontal plane, and to engage and close against one side of the sleeve and to be engaged by the first mentioned locking arm, a trigger and locking arm pivotally connected to the front portion of the coupling member, to close over the sleeve and bear upon the first named locking arm, and a locking device to engage the trigger and locking arm.

2. In combination with a vehicle axle, a sleeve attached thereto, a locking arm pivotally connected to the sleeve for angular movement in a vertical plane and adapted to close upon the sleeve, a coupling device having means for the connection of a tongue or thill iron and provided with a rearwardly extending arm to enter the sleeve, a locking arm pivotally connected to the rear end of the arm of the coupling member for angular movement in a horizontal plane, and to engage and close against one side of the sleeve and to be engaged by the first mentioned locking arm, a trigger and locking arm pivotally connected to the front portion of the coupling member, to close over the sleeve and bear upon the first named locking arm, and a spring-actuated bolt carried by the axle to engage and lock the said trigger and locking arm.

In testimony whereof I hereunto affix my signature in the presence of two witnesses.

FRANK CHANDLER.

Witnesses:
H. H. LAIR,
F. L. TERRELL.